May 21, 1968

R. M. MILTON 3,384,154

HEAT EXCHANGE SYSTEM

Filed May 12, 1964

INVENTOR
ROBERT M. MILTON

BY Leo A. Plump
ATTORNEY

May 21, 1968  R. M. MILTON  3,384,154
HEAT EXCHANGE SYSTEM

Filed May 12, 1964  5 Sheets-Sheet 2

INVENTOR
ROBERT M. MILTON
BY
Leo A. Plum, Jr.
ATTORNEY

May 21, 1968   R. M. MILTON   3,384,154
HEAT EXCHANGE SYSTEM
Filed May 12, 1964   5 Sheets-Sheet 4

INVENTOR
ROBERT M. MILTON

BY Leo A. Plum, Jr.
ATTORNEY

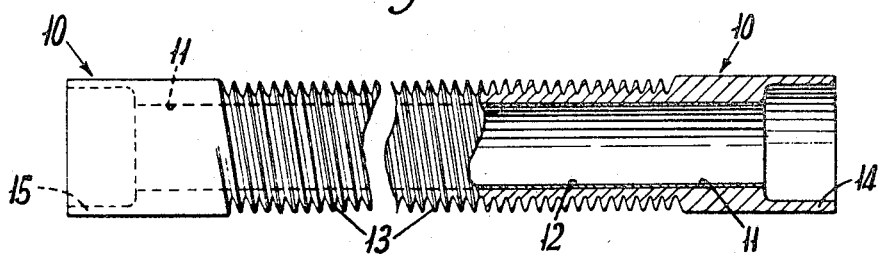
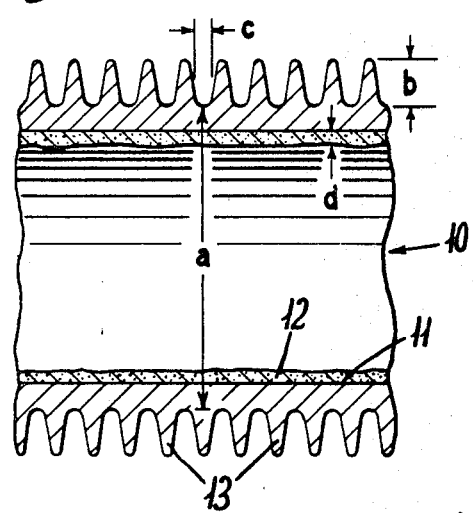
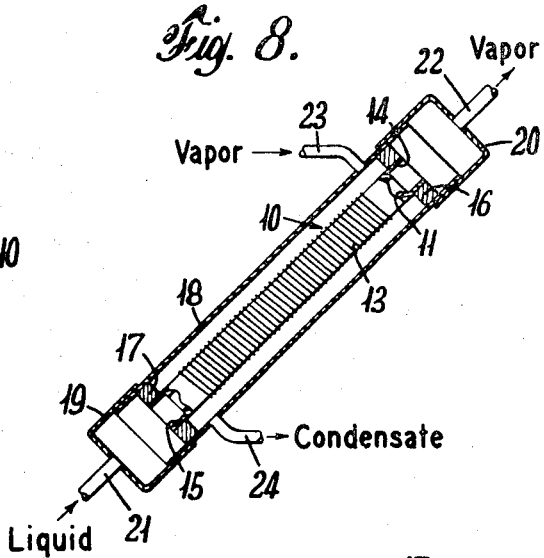
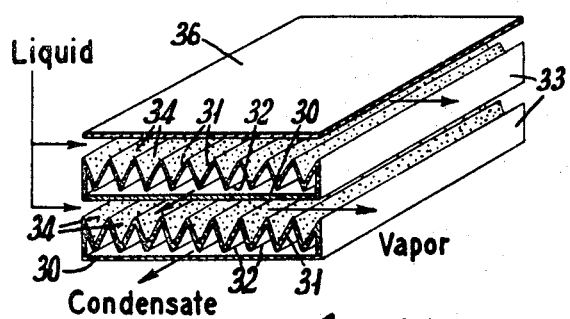
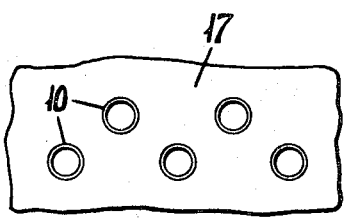

United States Patent Office 3,384,154
Patented May 21, 1968

3,384,154
HEAT EXCHANGE SYSTEM
Robert M. Milton, Buffalo, N.Y., assignor to Union Carbide Corporation, a corporation of New York
Continuation-in-part of applications Ser. No. 849,608 and Ser. No. 849,665, Oct. 29, 1959, which in turn are a continuation and division, respectively, of Ser. No. 607,233, Aug. 30, 1956. This application May 12, 1964, Ser. No. 366,853
6 Claims. (Cl. 165—1)

This application is a continuation-in-part of application Ser. No. 849,608, filed Oct. 29, 1959, which itself is a continuation of application Ser. No. 607,233, filed Aug. 30, 1956, both now abandoned. This application is also a continuation-in-part of application Ser. No. 849,665, filed Oct. 29, 1959, which itself is a division of the previously referenced application Ser. No. 607,233, filed Aug. 30, 1956, both now abandoned.

This invention relates to the art of improving heat transfer from heated surfaces to boiling liquids.

The transfer of heat at effective rates from a heated surface to a boiling liquid in contact therewith ordinarily requires a substantial temperature difference between the surface and the liquid which greatly affects the efficiency of heat transfer. One important factor controlling this efficiency is the nature of the heated surface in contact with the liquid; it being known, for example, that smooth boiling surfaces produce low heat transfer coefficients on the boiling side. Low boiling heat transfer coefficients often severely restrict the heat transfer capacity of boiling apparatus. For example, when the heat for boiling is supplied by a vapor condensing on a smooth-walled heat transfer surface, the condensing heat transfer coefficient may easily be on the order of 2,000 B.t.u./hr.sq.ft. °F., while the boiling heat transfer coefficient against the opposite of the heat transfer surface may be only 100 to 200 B.t.u./hr.sq.ft. °F. According to the familiar method of summing heat transfer resistances when the boiling and condensing heat transfer surfaces are of equal area, the overall heat transfer coefficient U is obtained approximately as follows:

$$\frac{1}{U} = \frac{1}{h_C} + \frac{1}{h_B}$$

and $$U = \frac{h_B h_C}{h_B + h_C}$$

where $h_B$ and $h_C$ are the boiling and condensing heat transfer coefficients respectively. It is clear that if $h_B$ is small compared to $h_C$, then the value of U approaches $h_B$ and most of the advantage of a high condensing coefficient is lost.

Principal objects of the present invention are: to provide heat exchange apparatus for liquid boiling service with a porous boiling surface layer of a character which produces boiling heat transfer coefficients many times as large as those obtained with conventional smooth or roughened surfaces; to provide a porous boiling surface layer of a character that is able to transfer to a boiling liquid large quantities of heat at much lower temperature differences than required in conventional heat exchange apparatus; to provide a method of boiling a liquid which has substantially higher heat transfer coefficients at low temperature differences; and to provide a method of producing such a porous layer boiling surface on a heat exchange unit.

These and other objects and novel features of the invention will become apparent from the following description and accompanying drawing, in which:

FIG. 6 is a view partly in elevation and partly in section of an exemplary boiling surface and condensing surface element in the form of a condenser-evaporator tube member embodying the invention.

FIG. 7 is a fragmentary enlarged view in section of a portion of the tube unit.

FIG. 8 is a view showing a preferred inclined arrangement of a condenser-evaporator tube according to the invention.

FIG. 9 is a fragmentary end view of a preferred arrangement of such tubes when mounted in groups.

FIG. 10 is a perspective view of an alternative construction of evaporator-condenser units embodying the invention.

Figure 1:
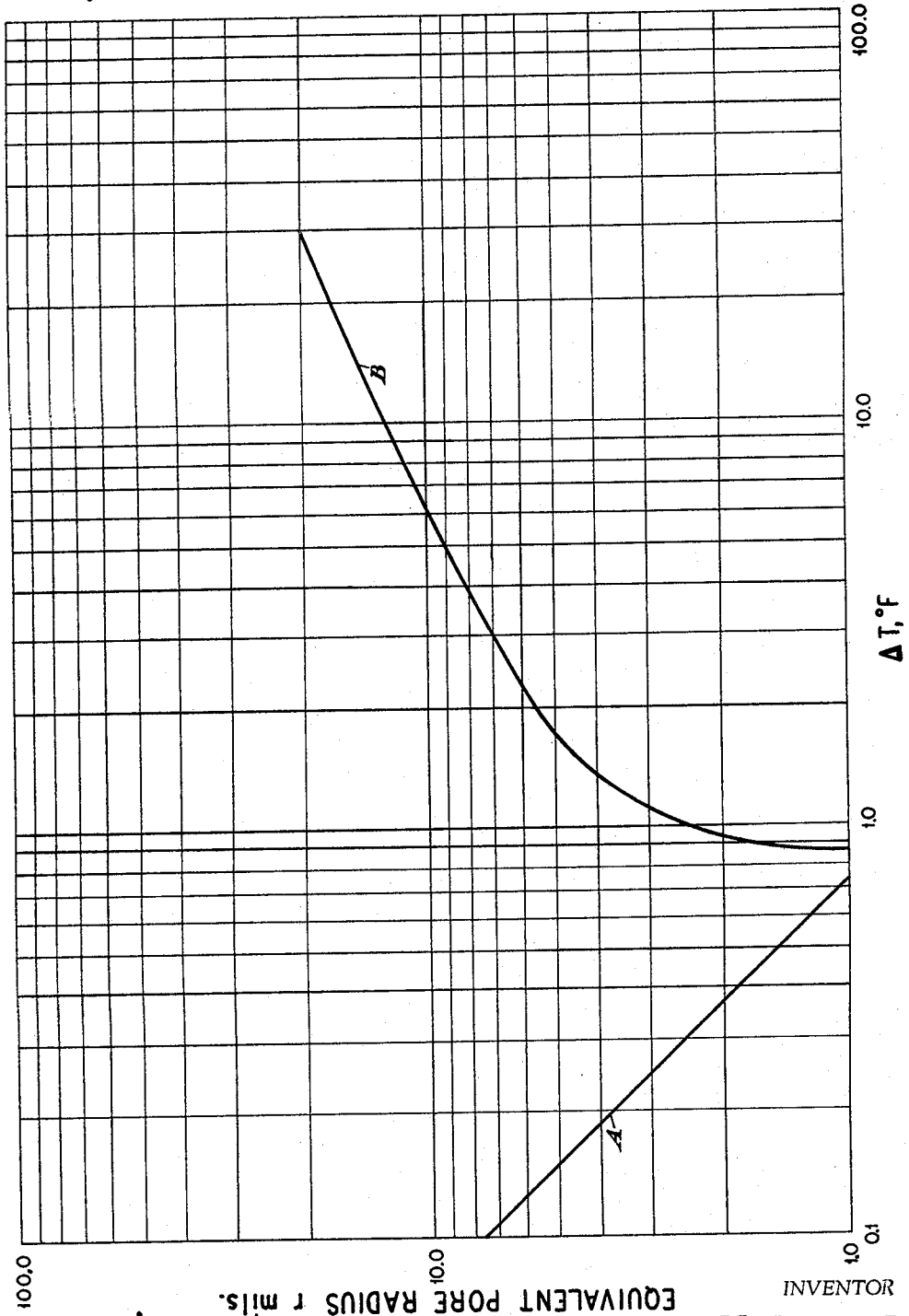
FIG. 1 is a curve which compares the properties of the porous boiling surface layers of this invention with the surfaces of the prior art.

According to the invention, there is provided a porous boiling surface layer having a multitude of small pores bonded on a thermally conductive wall of a heat exchange apparatus for transferring heat to a liquid. The porous boiling surface layer is formed of thermally conductive particles integrally and thermally bonded together to provide interconnected pores of capillary size within the porous boiling surface layer. The pores are provided in great number per unit area with little nonporous material between them. The porous boiling surface layer is characterized by pronounced capillarity which is described in detail subsequently.

Because of the high boiling heat transfer coefficients produced by the porous boiling surface layer, the temperature difference between a boiling liquid and its source of heat may be substantially reduced while nevertheless achieving a remarkably high rate of heat transfer. Porous boiling surface layers of this invention have been found particularly advantageous in systems requiring elevated pressures to achieve a necessary temperature difference; for example in the reboiler-condenser tubes of a low temperature air separation plant wherein the more volatile normally lower temperature boiling nitrogen gas is condensed by boiling less volatile oxygen liquid, the nitrogen being sufficiently pressurized to raise its condensing temperature above the oxygen boiling temperature. By using a porous boiling surface layer of the present invention, the necessary pressure differential between the fluids may be reduced and power costs minimized.

The preferred procedure for producing a satisfactory porous boiling surface layer comprises sintering, soldering, brazing, or otherwise thermally bonding a layer of fine particles to the base heat transfer surface to form interconnected pores therein having an equivalent pore radius less than about 6.0 mils. As used in this context, the "equivalent pore radius" empirically defines a porous boiling surface layer having varied pore sizes and non-uniform pore configurations in terms of an average uniform pore dimension.

An important function of the porous boiling surface layer of this invention is to increase the boiling heat transfer coefficient. In the well known heat transfer equation $Q/A = h\Delta T$, the porous boiling surface layer markedly increases the value of the coefficient "$h$." The effect of the increase in this coefficient can be utilized in several ways. The total quantity of heat transferred "Q" may be increased, the area "A" may be decreased, the "$\Delta T$"

may be reduced, or various combinations of these benefits may be realized.

Since the invention improves the coefficient "$h$," it is distinct from prior art uses of porous elements and devices known as "ebullators" which are commonly suspended or immersed in the boiling liquid to reduce superheat and to bring the bulk liquid temperature more nearly in equilibrium with the liquids vapor pressure. Ebullators are often non-metallic materials such as pumice which contain relatively large random-size pores, only a few of which need be active. The task of the ebullator is relatively easy and simple because the sensible heat represented by a few degrees superheat in the liquid is comparatively small and can be dissipated effectively by a modest degree of boiling. The suspended ebullator material need not be thermally conductive since it does not transfer heat to the liquid. The heat required for boiling on an ebullator surface is transported to that point by the liquid itself in the form of superheat. Thus, while a suspended ebullator may reduce the bulk superheat of the liquid substantially, some degree of liquid superheat must exist in order for boiling to take place in the ebullator.

In contrast to the ebullator art, the porous boiling surface layer of this invention is disposed on the hot wall of the boiling device between the hot wall and the liquid to be boiled and its material must be thermally conductive. Its task is the more difficult one of transferring a very large quantity of heat with a greatly reduced heat flow resistance, i.e. with a reduced temperature difference between the warm wall and the liquid. This temperature difference between the warm wall and the saturated liquid, which is a measure of the heat flow resistance, is the $\Delta T$ which appears in the standard heat transfer equation. Its reduction is achieved herein by the increased heat transfer coefficient of the porous boiling surface layer.

Even if materials constructed according to accepted ebullator practice are disposed against the warm wall, they will not achieve the superior results of this invention. To be effective, the porous surface must meet special limitations on the equivalent pore radius as defined hereinafter.

The extreme thinness of the liquid film within the pores is though to account in large part for the striking improvement in heat transfer coefficient $h$ achieved with this invention. It has been discovered that this is an effect which assumes significant proportions only in very small pores, and it is not significant in ebullators designed primarily to reduce superheat. The performance of ebullators is both described and predicted by the combination of the well known Gibbs and Clapeyron equations which relate the thermal potential required for growth of a bubble (in terms of the superheat of the liquid surrounding the bubble) to the size of the bubble:

$$r_c = \left(\frac{2\sigma}{T - T_S}\right) \frac{T_S(\rho_L - \rho_V)}{\rho_L \rho_V \lambda}$$

where:

$r_c$ = cavity radius (interchangeable with the equivalent pore radius $r$ of the porous boiling surface layers of the present invention, ft. Also the approximate radius of a bubble emerging from a cavity of radius $r_c$)
$\sigma$ = Surface tension, lbs. force/ft.
$T$ = Temperature of liquid surrounding a bubble, ° R.
$T_S$ = Saturation temperature of boiling liquid corresponding to the vapor pressure of the liquid, ° R.
$\rho_L$ = Density of liquid, lbs. mass/ft.$^3$.
$\rho_V$ = Density of vapor, lbs. mass/ft.$^3$.
$\lambda$ = Latent heat of boiling liquid, B.t.u./lb.

The value of $T$ must be greater than $T_S$ by an amount sufficient to cause a bubble of radius $r_c$ to grow against surface tension. Hence $T - T_S$ is the minimum superheat required to sustain the boiling process. According to the Gibbs-Clapeyron equation, the superheat necessary for bubble growth is reduced, i.e. $T - T_S$ is minimized, by increasing $r_c$ and hence an ebullator should be constructed with a porous surface having pores as large as possible which can still retain the entrapped gas or vapor needed to activate the nucleation cites. In FIG. 1, curve A plots $r_c$ vs. the superheat $\Delta T$ necessary to sustain bubble growth, i.e. $T - T_S$, according to the Gibbs-Clapeyron equation for fluorotrichloromethane boiling in contact with surfaces of various pore size with a heat flux of 1,000 B.t.u./hr. sq. ft. In keeping with the objective of ebullators to reduce the required superheat, the performance of a good ebullator would fall on the portion of curve A corresponding to low values of $\Delta T$ and high values of $r_c$. Tests show that this is indeed true since the values of $r_c$ measured for materials constructed as ebullators are between about 8 and 15 mils. The superheat $\Delta T$ corresponding to such pore radii is below 0.1° F.

However, if one wishes to take a step beyond the phenomenon of the ebullator and to improve overall boiling performance, it will not be sufficient merely to reduce the superheat required to sustain bubble growth. When boiling proceeds by the formation of bubbles within pores or cavities of a surface which comprises a heat source, the superheat $\Delta T$, $T - T_S$, correlated by the Gibbs-Clapeyron equation has been discovered to be only one of the resistances to the overall boiling process. A second $\Delta T$ exists across the liquid film between the wall temperature $T_W$ and the superheated vapor-liquid interface temperature $T$, and in effect this film $\Delta T$ is in series with the superheat $\Delta T$ of the Gibbs-Clapeyron equation. This film $\Delta T$, i.e. $T_W - T$, has been unexpectedly found to increase as $r$ increases, an effect opposite to that observed for the superheat $\Delta T - T_S$. The difference between curves A and B of FIG. 1 depicts this film $\Delta T$.

Neglecting the thermal resistance of the material of which the surface is composed, the overall boiling process is dependent upon the total $\Delta T$, $T_W - T_S$, which is approximately the sum of the film and superheat $\Delta T$'s. Thus, the sum of the two yields curve B corresponding to the experimental data of Table I. It is seen that a regime exists at the minimum of curve B where very low total $\Delta T$ is required to sustain the rate of boiling and where values of $r$ are distinct from the pore dimension of common ebullators. If common ebullators (having a pore radius of 8–10 mils) were coated on the heat transfer wall their performance would not be predicted by curve A (the Gibbs-Clapeyron curve) because that curve does not take into account the thermal potential required to transfer heat to the liquid-vapor interface surrounding the bubbles. FIG. 1 shows that whereas ebullator coatings might reduce the required superheat $\Delta T$ (curve A) to a very low value, the coincident film $\Delta T$ is very high and exerts an overwhelming influence.

The porous boiling surface layers of this invention are unique in that they effectively reduce the film $\Delta T$ and are therefore characterized by performance at the minimum portion of the curve where the film $\Delta T$ begins to lose its dominant influence and where values of $r$ are below 6 mils. In preferred practice, the equivalent pore radius, $r$, should be below about 4.5 mils.

Curves A and B of FIG. 1 represent the results obtained with fluorotrichloromethane as described above. Other liquids will provide similar curves, which due to the individual properties of each liquid will be, in general, displaced along the abscissa. For all such liquids, however, a porous boiling surface layer constructed according to the present invention will have an equivalent pore radius of less than about 6.0 mils and preferably less than about 4.5 mils.

Figure 2:
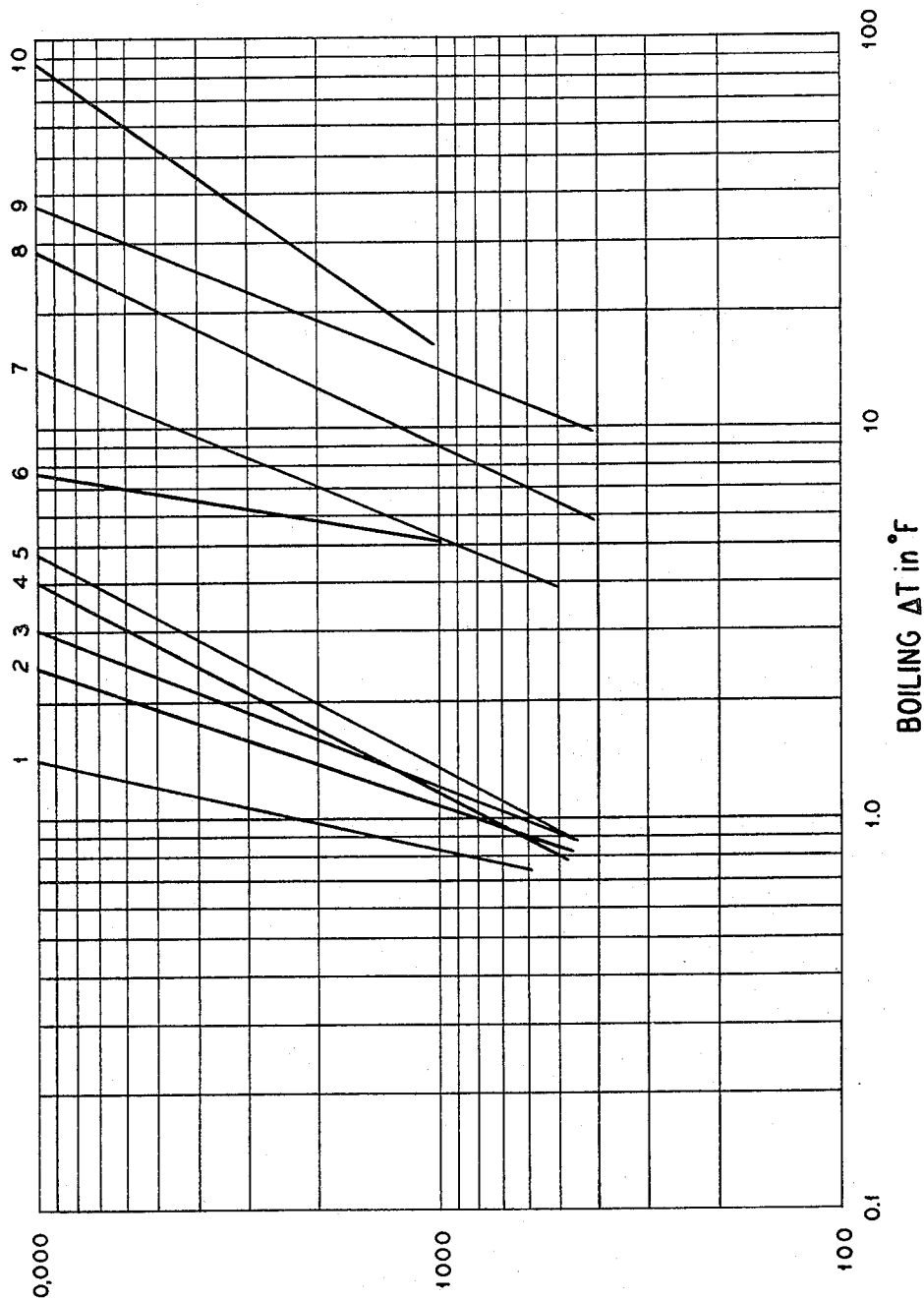
FIG. 2 is a series of curves comparing the pool boiling performance of the porous boiling surface layers of this invention with the surfaces of the prior art.

FIG. 2 shows in an even more striking manner the distinctive grouping of the porous boiling surfaces apart from conventional surfaces. The surfaces tested correspond to those listed in Table I and the curves are numbered accordingly. Prior art boiling surfaces have not approached the extremely high coefficients (heat flux per unit $\Delta T$) which are obtained in this invention as exemplified by FIG. 2.

The equivalent pore radius of a porous boiling surface layer is most conveniently and accurately determined by vertically immersing one end of the porous boiling surface layer in a freely wetting liquid and measuring the capillary rise of the liquid along the surface of the porous boiling surface layer. When determined in this manner, the equivalent pore radius, $r$, is equal to $2\sigma/\rho h$ where: $\rho$ is the density (in lbs. mass/cu. ft.) of the liquid in which an end of the porous boiling surface layer is vertically immersed: $\sigma$ is the surface tension (in lbs. force/ft.) of the liquid in which an end of the porous boiling surface layer is vertically immersed; and $h$ is the vertical capillary rise (in ft.) of the liquid along the surface of the porous boiling surface layer.

The advantage in choosing a freely wetting liquid to determine the equivalent pore radius is that the liquid phase contact angle ($\theta$), which the liquid surface makes with the materials of which the porous boiling surface layer is composed, will be very small and, therefore, will not effect the determination. If a freely wetting liquid is not chosen, the expression $2\sigma/\rho h$ must be equated to $r/\cos\theta$ and the contact angle ($\theta$) will have to be accounted for in determining the value of the equivalent pore radius ($r$). Since the exact measurement of the contact angle is difficult and unnecessarily introduces risk of error, it is preferable to use a freely wetting liquid to determine the equivalent pore radius. Liquids exhibiting a contact angle of less than 20° with the material of which the porous boiling surface layer is composed are defined as "freely wetting" for this purpose and may be used without having to account for the effect of the contact angle since cos 20° is 0.95 and the error resulting from neglecting the contact angle will be less than 5%.

Examples of suitable liquids which freely wet aluminum and copper surfaces (two of the preferred materials for constructing porous boiling surface layers) are methanol, fluorotrichloromethane, dichlorotetrafluoroethane, acetone, ethyl chloride, liquid oxygen and liquid nitrogen. The particular liquid chosen for determination of the equivalent pore radius should preferably be a good solvent for oil and grease so that the effect of the presence of these common surface contaminants will be minimized. Pure water is not considered to be a freely wetting liquid inasmuch as its contact angle ($\theta$) with an aluminum surface, for example, is about 66°.

The equivalent pore radius is independent of the properties of the material used to construct the porous boiling surface layer. It defines qualitatively the geometrical and dimensional characteristics of the porous boiling surface layer itself. The equivalent pore radius should not be employed to predict the quantitative performance of any particular porous boiling surface layer inasmuch as such performance will depend, inter alia, on the material of which the porous boiling surface layer is constructed and the liquid which is to be boiled.

Table I, column 2, summarizes the values of the effective pore radius determined experimentally for a number of surfaces including prior art ebullators as well as porous boiling surface layers of the present invention in freely wetting liquids—specifically methanol, fluorotrichloromethane, and dichlorotetrafluoroethane. Column 3, of Table I, shows the values of temperature differences required by the several surfaces to transfer 1,000 B.t.u./hr. sq. ft. while boiling fluorotrichloromethane. Since $Q/A$ is held constant at 1,000 the only variable in the heat transfer equations are $\Delta T$ and $h$, and these variables are inversely proportional. Consequently, a decrease in the required $\Delta T$ by a factor of 10 will increase the heat transfer coefficient $h$ by a factor of 10. Thus, column 3 of Table I provides a means of comparing the heat transfer capabilities of the various surfaces in a common fluid.

TABLE I

| 1 | 2 | 3 |
|---|---|---|
| Surface | Equivalent pore radius (in mils) | $\Delta T$ (° F.) required for $Q/A=1{,}000$ B.t.u./hr. sq. ft. |
| Porous Boiling Surface Layers: | | |
| 1. Copper, 325 mesh spherical, flat plate | 1.65 | 0.83 |
| 2. Copper, 325 mesh granular, cylinder | 1.67 | 1.10 |
| 3. Aluminium, 40-400 mesh granular, flat plate | 3.44 | 1.20 |
| 4. Copper, 35-60 mesh spherical, flat plate | 3.41 | 1.15 |
| 5. Aluminum, 80-100 mesh granular, flat plate | 3.0 | 1.33 |
| Metallic Ebullators: | | |
| 6. Mossy Zinc Ebullator | 10.0-15.0 | 5.0 |
| 7. Antimony ebullator, granular | 8.0 | 5.1 |
| Smooth Surfaces: | | |
| 8. Smooth copper plate* | (non-porous) | 8.8 |
| 9. Smooth aluminum plate* | (non-porous) | 14.0 |
| Non-metallic Ebullator: | | |
| 10. Sodium Silicate ebullators | 16.6 | 16.6 |

\* Exhibits no capillarity.

A porous boiling surface layer, as described above, in operation provides a multitude of interconnecting partially liquid filled capillaries which act as nuclei for the growth of many bubbles of the boiling liquid. If the pores were not interconnected, their continued performance as nuclei for bubble growth would be critically dependent upon retaining entrapped air or vapor within the pores. However, with inter-connected pores, vapor formed in one pore can activate one or several adjacent pores, so that the process continues without interruption and without dependence upon air or vapor entrapment. At least some of the pores in the inter-connected matrix are also believed to supply liquid to adjacent pores. As the bubbles grow, they finally emerge from the inter-connected capillaries, due to continued generation of vapor within the capillaries, break away from the surface, and rise through the liquid film covering the porous boiling layer. The liquid continues its flow into the capillaries and maintains the capillary walls wet, thus giving increased surface evaporation. The high boiling coefficient results from the fact that the heat leaving the base metal surface does not have to travel through an appreciable liquid layer before meeting a vapor-liquid surface producing evaporation.

Within the porous boiling surface layer, a multitude of bubbles are grown so that the heat, in order to reach a vapor-liquid boundary, need travel only through an extremely thin liquid layer having a thickness considerably less than the minute diameter of the confining pore. Vaporization of liquid takes place entirely within the pores and substantially no superheating of the bulk liquid is required or can occur.

With a smooth metal surface, however, only a few bubble points exist and the initiation of bubble growth requires a large degree of superheat due to the compressive force of liquid surface tension on a very small bubble. The heat for bubble growth must be transferred by convection and conduction from the smooth base metal to the distant vapor-liquid interface of a bubble which is almost completely surrounded by bulk liquid.

The above described performance of a porous boiling surface layer is not merely the result of increasing the surface area by, for example, mechanically roughening the surface. This fact was shown by a test comprising immersing a porous boiling surface layer bonded to a copper block containing embedded heating coils to boil liquid oxygen. At very low heat fluxes insufficient to activate the pores with vapor, the boiling heat transfer coefficient and the visual phenomena of bubble points were quite similar to those obtained with a smooth surface copper block. However, at higher heat fluxes producing vapor activation of the pores, extremely high boiling coefficients were obtained which are impossible to achieve with the smooth block or with a block having thoroughly mechanically roughened surfaces. The following test results in boiling liquid oxygen illustrate the effect of porous boiling surfaces at three temperature differences, and at heat fluxes sufficiently large to produce vapor activation of the pores.

TABLE II.—COEFFICIENTS OF HEAT TRANSFER

| Type Surface | Temperature Difference | | Heat Transfer Coefficient | |
|---|---|---|---|---|
| | °C. | °F. | Cal./°C. cm.² sec. | B.t.u./hr. sq. ft.,°F. |
| Smooth copper | 0.5 | 0.9 | 0.01 | 74 |
| Mechanically roughened copper | | | 0.02 | 148 |
| Sintered nickel [1] | | | 0.18 | 1,330 |
| Sintered copper [1] | | | 0.50 | 3,690 |
| Smooth copper | 1.0 | 1.8 | 0.013 | 96 |
| Mechanically roughened copper | | | 0.034 | 251 |
| Sintered nickel [1] | | | 0.28 | 2,060 |
| Sintered copper [1] | | | 2.83 | 6,120 |
| Smooth copper | 1.5 | 2.7 | 0.046 | 340 |
| Mechanically roughened copper | | | 0.046 | 340 |
| Sintered nickel [1] | | | 0.32 | 2,360 |
| Sintered copper exceeded [1,2] | | | 1.0 | 7,400 |

[1] Porous boiling surface layer of present invention.
[2] Value too large to be measured in test equipment.

Table II indicates that by using a porous boiling surface of this invention, even a metal such as nickel exhibits boiling coefficients far greater than those obtained with conventional surfaces of highly conductive copper, despite the fact that the conductivity of nickel is only ⅕ that of copper.

To illustrate the method of determining the equivalent pore radius, consider the following data and computation for item 1 of Table I and of FIG. 2. A small strip of copper sheet with the porous surface applied thereon was suspended vertically with one end immersed in fluorotrichloromethane. The liquid wetted the surface by capillary action to a height $h$ above the liquid surface of 0.21 ft. Fluorotrichloromethane has a surface tension of $1.30 \times 10^{-3}$ lbs./ft. and a density of 91.4 lb./cu. ft. Substituting these values into the equivalent pore radius equation gives a value for $r$ of $0.138 \times 10^{-3}$ ft. or 1.65 mils.

The powder particles used in preparing the porous boiling surface are preferably either granular or spherical. Geometrical considerations suggest that granular or spherical particles are more effective than flakes in producing a large number of approximately uniform sized pores. Very thin flakes are less desirable since they are difficult to bond as discrete particles, and because their extremely large surface area complicates the task of cleaning the powder thoroughly. A comparison of items 1 and 4 (spherical) with items 2, 3 and 5 (granular) in Table I and FIG. 2 shows that both granular and spherical particles produce excellent surfaces, with spherical particles showing some advantage.

In general, any metallic material is suitable for preparing the porous boiling surface, provided it has good thermal conductivity, is available as a fine powder, is bondable to itself and to the base metal, and is easily wetted by the liquid to be boiled.

The particle material should preferably have high thermal conductivity as stated previously. Among others, nickel and copper porous boiling surface layer materials on copper base metal have been tested under identical conditions; the copper-on-copper heat transfer coefficient being about three times as large as the nickel-on-copper combination which is to be expected because of the higher thermal conductivity of copper. Further evidence of the desirability of high thermal conductivity is seen in FIG. 2 where the performance of fine-mesh copper surfaces (curves 1 and 2) is better than fine-mesh aluminum surface (curve 3). The conductivities of copper and aluminum are 224 and 117 B.t.u./hr. sq. ft. °F./ft., respectively. In corrosive service, alloys, such as stainless steel, resistant to chemical attacks may be used.

The optimum thickness of the porous boiling surface is only slightly affected by the physical properties of the boiling liquid. This is indicated by tests wherein high boiling heat transfer coefficients are obtainable in steam-water service from a porous boiling surface having a thickness previously determined as optimum for oxygen service. The thickness of the porous boiling surface layer may vary by at least a factor of 10 without severe detriment. The thickness should be greater than the average particle diameter and preferably should be at least twice the average particle diameter. With fine particles such as 323 mesh, uniformity and complete continuity of the coating will usually govern the minimum thickness which is applied. A practical minimum thickness is about 0.1 mm.

Functionally, the maximum thickness which can be used without detriment is controlled only by the capillarity of the surface and by the ability of the surface to discharge the vapor produced in boiling. In operation, the surface should be capable of drawing the liquid all the way through the thickness to the base metal so that the surface is completely wetted, while at the same time discharging and disengaging the vapor from the pores. Excellent results have been obtained with relatively thick surfaces; for example, the porous boiling surface layer of item 1 of Table I and of FIG. 2 is 0.25 mm. thick.

The relationship between particle size and performance of a porous boiling surface layer is not exact. Tests show that excellent porous boiling surfaces can be formed of powder having very fine granular or spherical particles 1–50 microns in size. Such porous boiling surfaces have exhibited very high boiling heat transfer coefficients in tests with liquid oxygen and with water. However, other tests indicate that there is very little performance difference in boiling liquid oxygen between porous boiling surfaces produced from fine powder, e.g. screen analysis showing a major portion (98%) passing through 325 mesh (98% <44 microns), and coarse powder, e.g. 50–60% passing through 100 mesh (50–60% <150 microns). If present in sufficient number, the smaller particles determine the pore dimensions since they will fill the voids between the large particles.

A suitable porous surface according to the invention may be produced by sintering 1 to 50 micron-size particles of a heat conductive metal such as copper to the hot wall supplying heat to the boiling liquid. The particles are applied in such quantity to provide a porous layer thickness between about 0.1 mm. and 1.0 mm. The interstices or voids between the particles should be essentially free of solid material and should be interconnected within the depth of the layer. The interconnected pores thus formed will be between about 1 micron and 150 microns in size and there will be a great number per unit area of surface.

In selecting the powder for surface preparation, one should be guided by the fact that the equivalent radius of the pores of the porous boiling surface layer is the critical factor and that particle size alone is not necessarily determinative. As indicated above, the particle size distribution within the range of sizes present in the sample will also influence the pore size. Particle shape will have an effect since spheres, for example, will stack more compactly than irregular shapes and will produce smaller voids. The innumerable variations which these factors permit makes it impractical to bracket all suitable powders within a single specification. For this reason, the equivalent pore radius determined by routine testing on specimens of the finished porous boiling surface layer as described previously is technically a more accurate method of identification.

Various methods for producing a sintered metal porous boiling surface on a base metal may be employed. One preferred method is to use a temporary binder such as a plastic material to establish and maintain a uniform coating on the base metal surface, the binder being such that it decomposes and vaporizes during the heating and sintering process. One such plastic is an isobutylene polymer having a molecular weight of about 140,000 and known commercially as "Vistanex."

The plastic binder is dissolved in an appropriate solvent such as kerosene or carbon tetrachloride and sufficient metal powder is added to give a uniform viscous slurry with a metal-plastic weight ratio of about 92 to 1. The base metal surface must be free of grease, oil and oxide coating to obtain proper bonding of the porous coating. Just before applying the slurry, the surface may be flushed with the plastic solution to facilitate wetting by the slurry, thereby obtaining more even distribution.

A number of methods may be used for applying a slurry coating to the base metal. The object is to achieve a uniform coating, and the selection of the method will depend upon the geometry and orientation of the surface. Spraying and dipping are two procedures which have been used successfully.

The coating is air-dried either during or after the application procedure. The bulk of the solvent is thus removed by evaporation leaving a solid, self-supporting layer which is held in place by the binder. Then the base metal and the coating are blanketed with a mildly reducing atmosphere and the temperature is raised for a sufficient time to sinter the particles together and to the base metal. The circulating reducing gas removes the thin oxide film and also purges the decomposition products from the surface materials. In the case of copper, the coating is sintered at about 180° F. below its melting point, or about 1760° F.

Another successfully employed binder is a methyl cellulose polymer having a viscosity of 4000 cps. and known commercially as "Methocel." A preferred slurry comprises 32 grams of copper powder in 100 cc. of a 2% water solution of such polymer. After application of a coating of the slurry on the base metal, it is air dried at ordinary temperatures (below the boiling point of water), and then furnace dried at about 750° F. in an atmosphere of water saturated annealing gas. The coating is then sintered at appropriate sintering temperatures.

Still another plastic binder which is successfully used is polystyrene which has a molecular weight of about 90,000 and is soluble in toluene or xylene.

As stated above, binders and slurries are used to facilitate distribution and to hold the powder temporarily in place until a permanent thermal bond can be achieved. When surface arrangement permits the powder may be applied and sintered in dry form; for example, the surface reported as item 1 in Table I and FIG. 2 was prepared in this manner.

One arrangement consists of applying the porous boiling surface on the inner wall of heat exchanger tubes. For such arrangement, an excellent procedure is to preliminarily distribute the slurry within the length of the tube, and then place the tube in a machine capable of rotating the tube about its own axis at a rate sufficient to produce a smooth coating, about 200 r.p.m. The coating is air-dried during the spinning operation and is then furnace sintered under the conditions previously described.

Another application procedure lends itself particularly to flat, corrugated or outside-cylindrical surfaces. According to this method, a slurry of metal powder and plastic binder is fed from a hopper onto the outer surface of a polished roll in a uniform layer. As the roll slowly rotates, the evaporation of the vehicle sets the plastic film and the latter is continuously stripped off the roll as a sheet of the plastic material containing the embedded metal powder. The composite film is then placed in contact with the surface of a metal sheet which is conducted into the furnace wherein the plastic is vaporized and the metal powder sintered to the sheet. This process lends itself very readily to quantity production methods.

Figure 3:
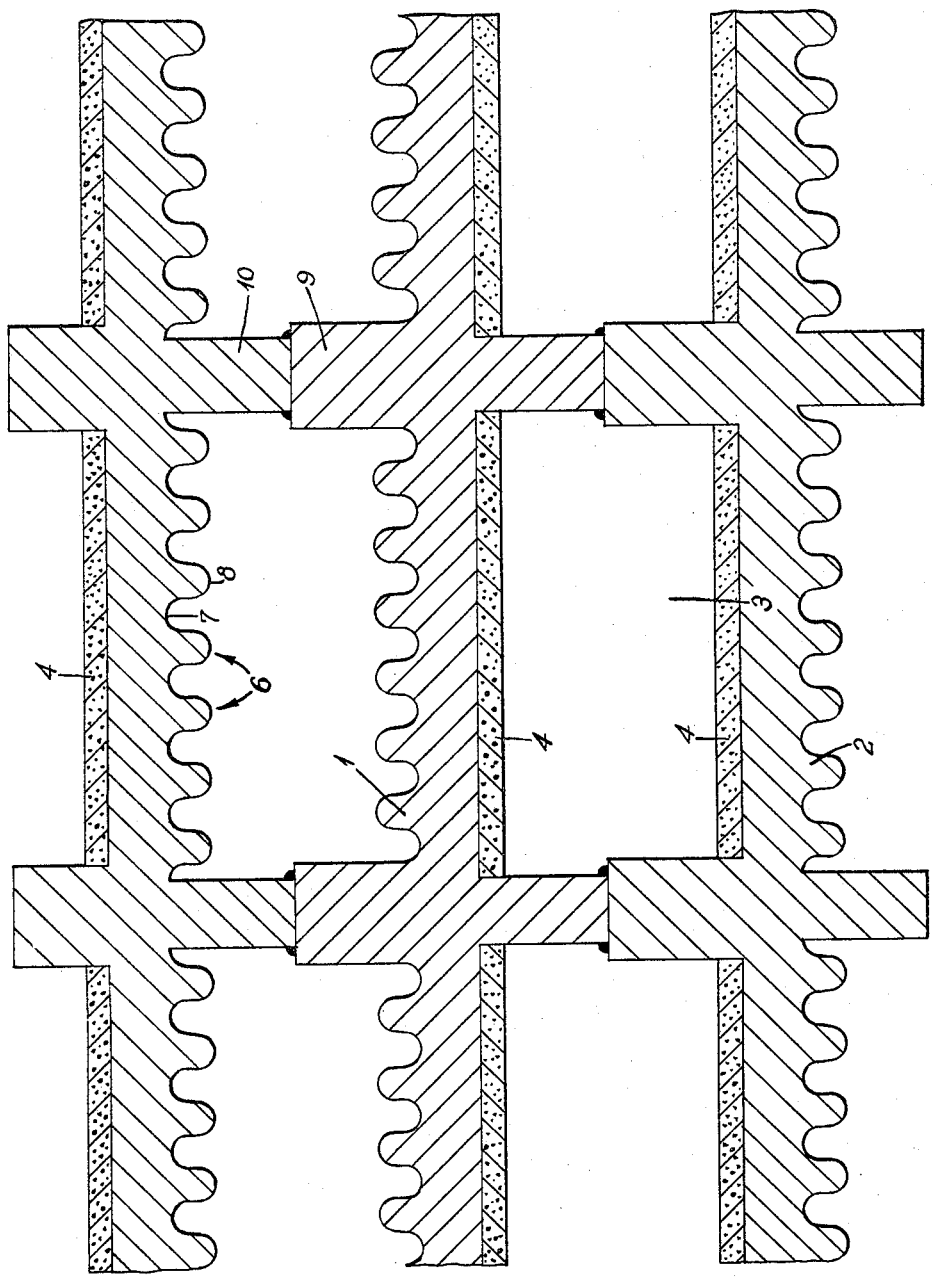
FIGS. 3–4 are sectional views in elevation of an exemplary plate-and-fin type heat exchanger illustrating embodiments of the invention.

One preferred construction of a heat exchange apparatus employing a porous boiling surface layer is shown in FIG. 3. This apparatus is a plate type heat exchanger comprising a plurality of fluid passes defined by parallel, spaced parting sheets housed in a core section with appropriate headers and manifolds for the fluid streams. As shown in FIG. 3, thermally conductive metal walls in the form of parting sheets 1 and 2, which define the fluid pass 3 for the boiling liquid are coated with a porous boiling surface layer 4, the fluid passes on either side of fluid pass 3 being provided for the warm fluid supplying heat to vaporize the liquid within the pores of the porous boiling surface layer. Protrusions 9 and 10 from the parting sheets are in registry and abut with one another to form stays between the passage walls.

Figure 4:
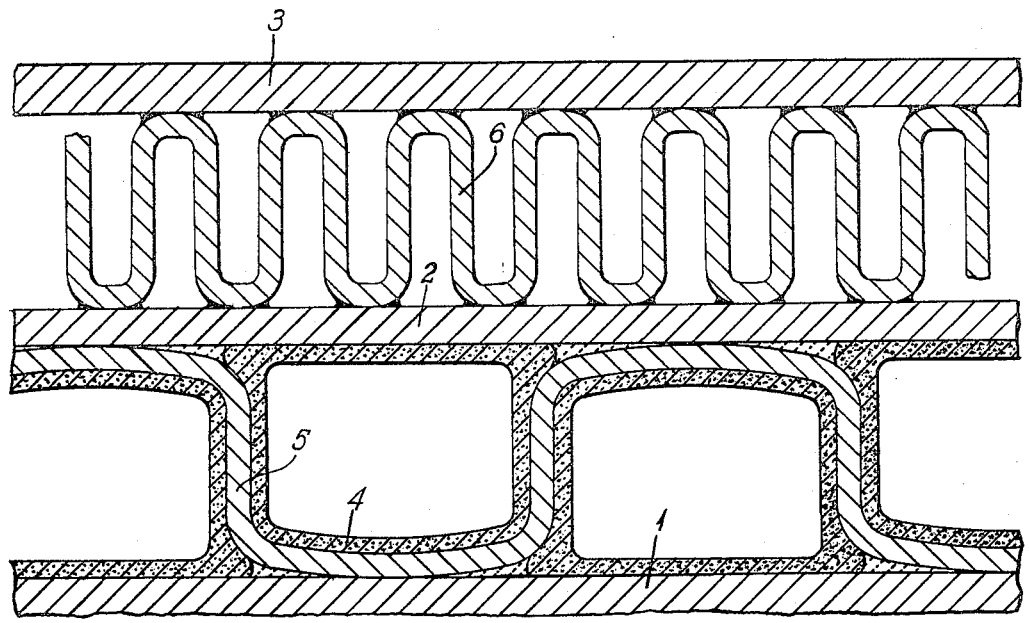

FIG. 4 shows another preferred construction for boiling condensing service using a flat plate type heat exchanger with corrugated fins in the passages. The boiling passage is formed between parting sheets 1 and 2 and contains fin material 5 with corrugations widely spaced, e.g. 6 per inch. All exposed surfaces in the boiling passage are shown coated with porous boiling surface layer 4. The condensing passage is formed between parting sheets 2 and 3 and contains fin material 6 with corrugations closely spaced, e.g. 25 per inch. The closely spaced fins provide high surface area and distribute the condensate in a thinner layer of lower heat flow resistance. This increase $h_c A_c$ with respect to $h_B A_B$ and brings these factors into balance.

Figure 5:
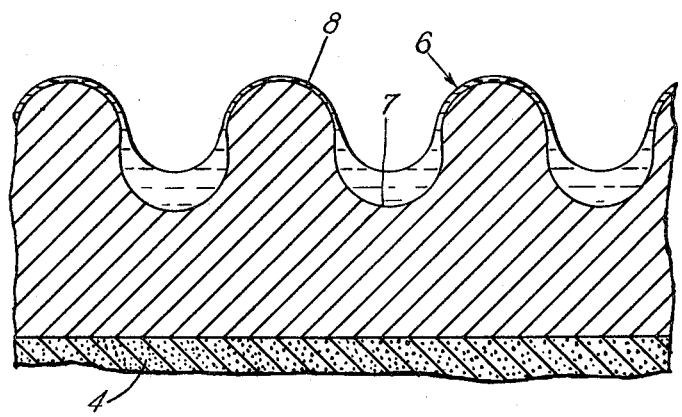
FIG. 5 is a sectional view in elevaton of an exemplary condensing surface embodying the invention.

To take maximum advantage of the increased boiling heat transfer coefficient achieved by use of porous boiling surface layers in apparatus utilizing a condensing fluid as a heat source, it is desirable to provide special condensing surfaces which permit achieving a high condensing heat transfer coefficient. FIG. 3 also shows such a condensing surface constructed in the form of very fine corrugations 6 which permit condensed liquid to be drawn by surface tension to the valleys 7 of the corrugations leaving the crests 8 stripped of all but a thin layer of liquid as shown in FIG. 5. The utility of a condensing surface such as shown in FIG. 5 is not limited to plate-and-fin type heat exchangers such as shown in FIG. 3. For example, such a surface may be applied to the exterior surfaces of tubes in shell-and-tube type heat exchangers where a porous boiling surface layer is bonded to the interior surface of the tubes.

Referring to FIG. 5, a condensible vapor contacts the corrugated surface 6 and forms a condensate film thereon. The film, or more precisely the vapor liquid interface, acts as a membrane which is stretched elastically by surface tension over the crests of the corrugations. Therefore, the pressure in the liquid under the interface in the arc of each crest is greater than the pressure of the vapor above the interface. In the valleys 7, the curvature of the liquid-vapor interface is reversed and the tension therein produces the opposite effect; the pressure in the liquid is less than the pressure of the vapor. Because the pressure exerted by the interfacial membrane is greater in the crest area than in the valley area, the condensate flows into the valley leaving a very thin film over the crest. Once in the valleys, the condensate flows parallel to the valleys (normal to the plane of FIG. 5) under the force of gravity to a suitable manifold means where it is withdrawn from the condensing surface.

If the crests and valleys are too wide, the radius of curvature of the interfacial membrane will be large and the surface tension effect small. If the corrugations are too shallow, the valleys will have insufficient liquid-holding capacity and the crest area will flood. If the corrugations are too deep, the effectiveness of the interfacial membrane tension in the crest area will be reduced. Satisfactory dimensions must be designed with consideration of the condensing-liquid density, viscosity, surface tension, and the like. Usually, the valley 7 and crest 8 of the corrugations would have semi-circular cross-sections with radii between about 0.005 and 0.015 inch.

FIGS. 6 and 7 of the drawings show another embodiment of the present invention comprising a thermally conductive metal tube 10 which is provided on its internal boiling surface 11 with a porous boiling surface layer 12 formed of metal powder particles sintered to each other and to the inside surface of the tube 10. The outer surface of the tube is preferably provided with fins or flanges 13 metallically bonded or molecularly integral with the tube 10 for most efficient heat conduction. In one organization, a plurality of such finned tubes is mounted between headers in a reboiler-condenser portion of an apparatus for air separation by low-temperature rectification into its primary constituents oxygen and nitrogen wherein gaseous nitrogen at approximately 60–100 p.s.i. is condensed on the finned outer side of the reboiler tubes, and liquid oxygen at approximately 0–15 p.s.i. is boiled in the porous surface coated inside of the tubes. The heat required to boil the liquid oxygen is transferred from condensing nitrogen and radially inward across the fins and through the metal wall to the boiling oxygen. The ends of the tube unit may be constructed for mounting in openings, tube headers being preferably expanded to a larger diameter as shown at 14 and 15.

In FIG. 8, for clearness of illustration, only one tube unit 10 is shown mounted between headers 16 and 17 which seal off lower and upper portions of a condenser casing 18, the tube ends 14 and 15 being secured gas-tightly in corresponding openings of the headers. The casing ends are capped at 19 and 20 to form inlet and outlet chambers for liquid to be boiled, such as oxygen supplied through a conduit 21 and for collection of the resulting vapor which is led off by a conduit 22. The vapor, such as cold nitrogen to be condensed is conducted to an upper part of the casing 18 through a connection 23, and the resulting condensate, liquid nitrogen, may be led off through a lower connection 24. In practice, as many tubes 10 as are required are mounted between headers of suitable size.

Some geometric similarity may be noticed between FIGURES 5 and 7, but functionally they are quite different. As stated above condensate collects by surface tension in the very narrow valleys of FIG. 5 and runs off normal to the view of FIG. 5. In contrast, the fins of FIG. 7 are spaced wider apart so that condensate, tending to flow longitudinally of the tube, is instead diverted or stripped away from the tube and flows off the tips of the fins.

Referring again to FIG. 7 "$a$" is the root diameter at the base of the fins, "$b$" is the radial height of the fins, "$c$" is the fin spacing or length of tube between fins. In condensing service, these dimensions all have an important effect on the condensing heat transfer coefficient, and the following discusses the optimum values which we have found for nitrogen condensation.

It was found experimentally that beyond a certain upper limit of fin height, the condensing coefficient does not increase proportionately with increasing fin area. This may be explained on the basis that the high but finite thermal conductivity of the metal fins imposes relatively an appreciable resistance to the flow of heat, so that there is a temperature gradient radially through the fins and fin areas further removed from the tube cannot be as effective as fin areas closer to the tube. Although in most heat transfer problems, the fins can be assumed to be perfect conductors, in this special case of condensing nitrogen at low temperature differentials it was found that the thermal gradient in the fin becomes a large enough part of the total condensing resistance to limit the effectiveness of fins higher than about 0.5 cm. for dimension "$b$." Furthermore, an important factor not included in Nusselt's Law has been discovered to be the ratio of the fin height to its average thickness. For nitrogen, we have found the optimum range of such ratio to be between 3 and 4 and a useful range between 3 and 5.

A finned tube may be considered as a series of short tubes with the condensate stripped off by each fin. Thus, the spacing between the fins at their base may be taken as the tube length L of Nusselt's law.

Theoretically it is desirable to use as many fins per unit tube length as possible, but we have found experimentally that when the fins become too close to each other, surface tension causes the liquid to hold up between fins and prevent further condensation on either fins or tubes.

If this occurs, heat transfer is substantially reduced because of the smaller available surface area for condensing and the increased film resistance. Thus, a balance exists between fin plugging from too closely spaced fins and a decrease of heat transfer values due to excessive fin spacing, and I have found that an optimum range for nitrogen is between 1.5 and 2.2 mm. for dimension "$c$" although spacings up to 3 mm. are efficient.

It was also found that the condensing coefficient improves when the finned tube is tipped from the vertical to an inclined position which promotes draining of the condensate away from the tube and off the fins. Although a condenser with 45° inclined tube is shown in FIG. 3 and may be preferred for fabrication, any appreciable angle of inclination down to horizontal will give higher efficiencies than the vertical position. Thin baffle sheets may be inserted between tube rows to prevent drainage from higher to lower fins in adjacent rows or the lower tubes may be offset or staggered in relation to the upper tubes as illustrated in end view in FIG. 9. Another means for improving drainage is to cut small longitudinal notches or slots through the fins.

The fins may be molecularly integral with the tube or thermally metallically bonded thereto and formed by extrusion, rolling, casting, or machining, and the profile can be rectangular or tapered. The rectangular profile is preferred because of slightly higher heat transfer efficiency; however, this form cannot easily be rolled, and hence is less economical for quantity production. FIGS. 6 and 7 illustrate a fin with a 20° included angle between the fin surfaces which is approximately the minimum angle that can be readily rolled. This slight departure from a rectangular profile approaches the latter in efficiency. For example, I obtained an overall coefficient as high as 3,000 B.t.u./hr./sq. ft./° F. on a laboratory scale model using specially machined rectangular profile finned tubes. A coefficient of approximately 2,000 B.t.u./hr./sq. ft./° F. was obtained on a large commercial scale test using the tapered profile type finned tubes manufactured in a manner suitable for quantity production.

The above described finned tube with optimum dimensions is thus seen to provide an effective means for increasing the nitrogen condensing coefficient of an air separation plant reboiler-condenser. When combined with the porous surface which increases the oxygen boiling coefficient, the apparatus produces an overall heat transfer coefficient which is at least 13 times that obtained by the reboiler-condenser customarily in use.

The most widely used air separation plant reboiler is known as the Kestner type condenser. In a large oxygen plant, this may comprise 25,000 individually installed 5-ft. long tubes with nitrogen condensing on the outside of the tubes and oxygen boiling on the inside with a percolating effect. Overall heat transfer coefficients for the Kestner condenser are in the range of 100–150 B.t.u./hr./sq. ft./° F. at overall temperature differences of 4–10° F. As previously mentioned, our tests show that with the porous boiling surface-finned condensing surface tube according to this invention, an overall coefficient of approximately 2,000 B.t.u./hr./sq. ft./° F. is obtainable, and the optimum temperature difference is only 0.6–1.0° F. This means that in addition to increased efficiency, a substantial reduction in both cost and size of an important part of the apparatus can be realized. For example, based on an overall coefficient of 2,000 and a $\Delta T$ of 3.4° F., the diameter of the reboiler may be reduced at least 50% and the number of tubes reduced to about 5% of the number required for the Kestner unit. The overall cost of a reboiler may thus be reduced to about 64% of the cost of a conventional Kestner apparatus. Furthermore, a very important substantial power saving may be realized by virtue of the smaller overall temperature differential.

As previously mentioned in the case of condensing nitrogen, a temperature gradient in the fins was found to limit the amount of added condensing surface that can be employed on tubes by increasing the length "b" of the fins. An alternative construction which avoids such fin temperature drop employs corrguated surfaces as shown in FIG. 10 where ample condensing surface is made avaliable, yet only a thin thickness of metal separates the extended area condensing surface from the boiling surface. Only two heat exchange units are shown in FIG. 10 and these are of the plate type each including a flat lower plate 30 above which is a deeply corrugated heat exchange plate 31 having corrugations with relatively sharp angled lower edges 32 that depend close to but preferably do not touch the plate 30. The plates are sealed by members 33 joining their edges to form a passage between plates 30 and 31 for the condensing vapor such as nitrogen. The upper surface of the corrugations of plate 30 is provided with the porous surface layer 34 according to the invention over which the boiling liquid flows such as oxygen. To provide separate passages for the two fluids, a plurality of such units are assembled as shown; and for convenience of providing flow connections, the nitrogen may be flowed lengthwise of the corrugations while the oxygen may be flowed crosswise as indicated by the arrows. The oxygen passes are provided by the space between the porous surface coated corrugations and the lower plate 30 of the next higher unit and for the upper unit by a flat plate 36 thereabove. The nitrogen condensate draining from the corrugations flows along the top surface of the flat sheet and off at one side due to a preferred slight inclination of the apparatus.

Although the low-temperature uses of the porous boiling surface and heat exchange unit according to the invention have been emphasized, experiments show that the improvements are also advantageous at room temperature and elevated temperature operations. For example, one such porous boiling surface layer was used to boil fluorotrichloromethane (boiling point of 73.8° F.) and was found very efficient. In boiling water tests, overall coefficients on the order of 2,000 B.t.u./hr./sq. ft./° F. were obtained, which can be compared with conventional design evaporator coefficients of about 300 B.t.u./hr./sq. ft./° F. On the basis of heat transferred per unit volume occupied by tubes, the unfinned porous surface unit represents a fivefold advantage.

What is claimed is:

1. In a plural stream heat exchanger of the plate-and-fin type which comprises a core having therein a set of fluid passes for each fluid to be passed therethrough provided by a plurality of parallel spaced parting sheets, and header means providing fluid communication with the fluid pass sets, the improvement comprising a porous boiling layer bonded to the sides of adjacent parting sheets which define walls of the fluid passes of one set and constructed of thermally conductive particles integrally bonded together to form interconnected pores of capillary size having an equivalent pore radius less than about 4.5 mils.

2. Apparatus according to claim 1 wherein corrugated fin sections are provided in the fluid passes having said porous boiling layer therein to define a plurality of fluid passages in each of such fluid passes; and wherein said porous boiling layer is bonded to the surfaces of such fin sections such that the walls of each of said fluid passages are provided with said porous boiling layer.

3. Apparatus according to claim 1 wherein the opposite sides of the parting sheets provided with said porous boiling layer are provided with finely corrugated surfaces with the valleys and crests therein having semi-circular cross-sections.

4. Apparatus according to claim 3 wherein the valleys and crests of the corrugations have radii less than about 0.015 inch.

5. A process for transferring heat from a warm fluid to a boiling liquid comprising the steps of providing heat exchange apparatus having a thermally conductive wall with a porous boiling layer bonded to one side of such wall, said porous boiling layer being constructed of thermally conductive particles bonded together to form interconnected pores of capillary size having an equivalent pore radius less than about 4.5 mils; completely covering said porous boiling layer directly with said liquid as at least a liquid film; and contacting the warm fluid with another side of said wall such that vapor bubbles are formed within said porous boiling layer by heat transferred thereto from said warm fluid; and discharging said vapor as bubbles emerging from said porous boiling layer into the liquid film portion covering said porous boiling layer.

6. A process according to claim 5 wherein the temperature difference between said boiling liquid and said warm fluid is less than about 1° C.

References Cited
UNITED STATES PATENTS

| | | | |
|---|---|---|---|
| 1,775,358 | 9/1930 | Smith | 165—180 |
| 1,922,254 | 8/1933 | McCullock | 117—46 |
| 1,931,268 | 10/1933 | Philipp | 62—527 |
| 2,350,348 | 6/1944 | Gaugler | 62—527 |
| 2,565,221 | 8/1951 | Gaugler | 62—527 |
| 2,675,333 | 4/1954 | Trout et al. | 117—97 |
| 2,695,248 | 11/1954 | Ormitz et al. | 117—65 |
| 2,700,624 | 1/1955 | Wagner et al. | 117—97 |
| 2,721,811 | 10/1955 | Dacey et al. | 117—65 |
| 2,826,309 | 3/1958 | Forman et al. | 117—22 |
| 2,985,434 | 5/1961 | Bourg et al. | 165—166 |
| 2,995,344 | 8/1961 | Hryniszak | 165—166 |
| 3,045,138 | 7/1962 | Pohl | 165—180 |

EDWARD J. MICHAEL, *Primary Examiner.*

CHARLES SUKALO, ROBERT A. O'LEARY,
*Examiners.*